UNITED STATES PATENT OFFICE.

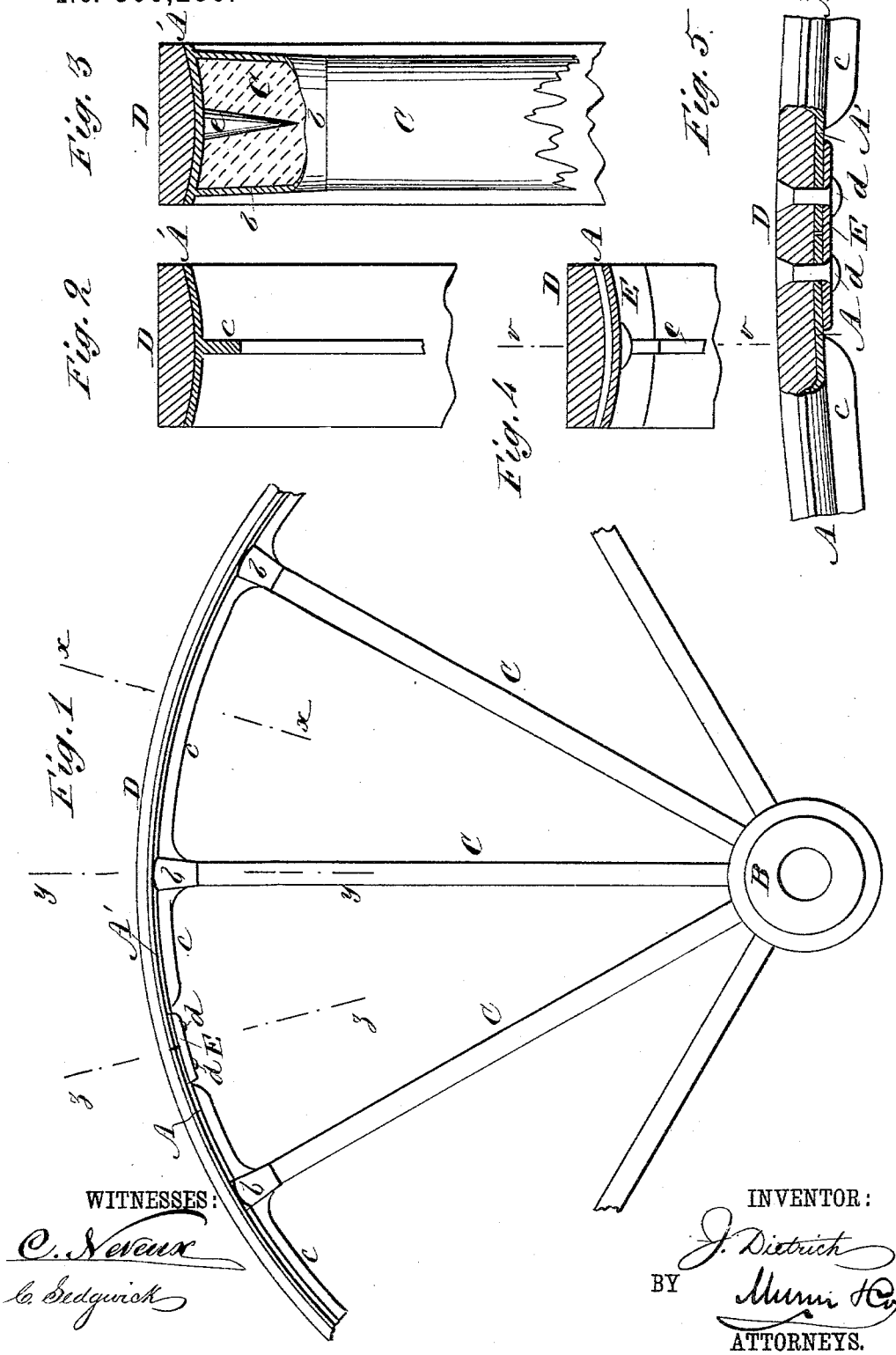

JACOB DIETRICH, OF BRUSHLAND, NEW YORK.

VEHICLE-WHEEL.

SPECIFICATION forming part of Letters Patent No. 300,230, dated June 10, 1884.

Application filed March 6, 1884. (No model.)

*To all whom it may concern:*

Be it known that I, JACOB DIETRICH, of Brushland, in the county of Delaware and State of New York, have invented certain new and useful Improvements in Wheels for Wagons and other Vehicles, of which the following is a full, clear, and exact description.

This invention more particularly relates to combined wooden and metal vehicle-wheels; and it consists in certain novel constructions and combinations of parts making up the felly portion of the wheel, which is of metal; and in the manner of securing the spokes therein, whereby lightness is combined with strength in the construction of the wheel without impairing its elasticity, and the tire, except by breaking, is prevented from working off the wheel, substantially as hereinafter described.

Reference is to be had to the accompanying drawings, forming part of this specification, in which similar letters of reference indicate corresponding parts in all the figures.

Figure 1 represents a side view of a vehicle-wheel in part embodying my invention; Fig. 2, a section on the line $x\ x$ in Fig. 1; Fig. 3, a section on the line $y\ y$ in Fig. 1; Fig. 4, a section on the line $z\ z$ in Fig. 1; and Fig. 5, a mainly sectional view on the line $v\ v$ in Fig. 4, the several figures 2, 3, 4, and 5 being upon a larger scale than Fig. 1.

The rim or felly portion of the wheel is composed of two or more cast-metal circumferential sections, A A', made concave on the exterior of their peripheries, but convex on their inner surfaces, and having spoke-sockets $b\ b$ on their interior, with flanges $c\ c$, of any desired strength, connecting the several spoke-sockets.

B is the hub of the wheel, which may be made of wood, as also the spokes C, that are fitted to the hub in any suitable manner, and of which there may be any desired number. After the hub and spokes have been fitted together, the rim or felly sections A A' are put on the outer ends of the spokes, or the latter driven full size, if desired, at the said ends into the sockets $b$. An iron or steel tire D, of convex form on its inner surface, corresponding with the concave outer surface of the rim, is then shrunk on the rim, which is readily done by slipping it, when hot, over the rim. This concavo-convex construction of the rim and tire does away with all possibility of the tire, unless it be broken, working off the wheel, and the concave rim will be much stronger than a flat one of equal weight. Where the sections A A' of the rim come together, the same are secured by bolts or rivets $d\ d$, arranged to pass through the tire D, rim-sections A A', and an inner re-enforcing plate, E; or the re-enforcing plate E may be an integral part of one side or end of a rim-section, and the other side or end be slipped over it, thereby requiring only one bolt or rivet. The whole metal-rim portion of the wheel need not be any heavier than a wooden one. The sockets $b$ are made of slightly-increasing area in an outward direction, and a blind wedge, $e$, is inserted in the outer end of each spoke, which wedges are driven inward when the rim-sections are fitted onto the spokes, thus causing the spokes to be tightly wedged within the sockets $b$.

I am aware that a blind wedge and a tapering socket separate from the felly is not new; also, that it is old to form a wheel entirely of metal, with tubular spokes fitting into sockets in the hub and on the under side of the fellies, and that said fellies were concaved on their periphery, into which concavity was shrunk an iron tire; also, that a vehicle-wheel has been provided with wire spokes, metallic hub, and metallic fellies having concave faces provided with elastic bushing for the metallic tire to bear on; and I do not desire to claim any such construction, broadly, as of my invention.

Having thus described my invention, what I claim as new, and desire to secure by Letters Patent, is—

In a combined wooden and metal vehicle-wheel, the combination of the externally-concave cast metal rim or felly sections A A', the spoke-sockets $b$ on the interior thereof, the wooden spokes C, the wedges $e$, the internally-convex tire D, shrunk on and within the concave exteriors of the rim-sections, and the re-enforcing plates E, arranged on the inner surfaces of the end portions of the rim-sections and united with said sections and with the tire of the wheel, essentially as herein described.

JACOB DIETRICH.

Witnesses:
DAVID SLOON,
RANSOM A. GRANT.